United States Patent [19]

Davidsson

[11] Patent Number: 4,817,780
[45] Date of Patent: Apr. 4, 1989

[54] MEANS FOR SECURING OBJECTS

[76] Inventor: Mats I. Davidsson, Djupadal, S-502 78 Gånghester, Sweden

[21] Appl. No.: 852,445

[22] PCT Filed: Jul. 18, 1985

[86] PCT No.: PCT/EP87/00285
§ 371 Date: Mar. 20, 1986
§ 102(e) Date: Mar. 20, 1986

[87] PCT Pub. No.: WO86/00790
PCT Pub. Date: Feb. 13, 1986

[30] Foreign Application Priority Data

Jul. 23, 1984 [SE] Sweden ................................ 8403820

[51] Int. Cl.[4] .............................................. B65G 17/32
[52] U.S. Cl. .............................. 198/465.4; 198/476.1; 198/680; 198/803.7; 24/67.7; 294/104; 294/82.31
[58] Field of Search .................. 198/680, 465.4, 485.1, 198/486.1, 476.1, 477.1, 470.1, 803.3, 803.7, 803.8; 294/104, 82.31; 104/250; 211/45; 24/67.5, 67.7, 490, 502, 511

[56] References Cited

U.S. PATENT DOCUMENTS

| 1,423,952 | 7/1922 | McCracken | 198/803.3 X |
| 1,864,114 | 6/1932 | Angerpointner | 198/680 |
| 2,852,257 | 9/1958 | Sperry | 198/680 |
| 3,023,878 | 3/1962 | Fortsthoff et al. | 198/803.7 X |
| 3,091,326 | 5/1963 | Connick et al. | 198/803.3 |
| 3,262,579 | 7/1966 | Reich | 211/45 |
| 3,884,370 | 5/1975 | Bradshaw et al. | 198/803.7 X |
| 3,904,027 | 9/1975 | Gilles et al. | 294/104 X |
| 3,960,264 | 6/1976 | Carbine et al. | 198/465.4 X |
| 4,199,173 | 4/1980 | Greenless | 281/45 |

FOREIGN PATENT DOCUMENTS 0160419 3/1933 Switzerland .
0170749 7/1934 Switzerland .

Primary Examiner—Robert J. Spar
Assistant Examiner—D. Glenn Dayoan

[57] ABSTRACT

An apparatus for securing objects comprising a locking arm (6) which is pivotally mounted in a frame (2) and in a securing position is forced against a surface of the frame with the object lying in between and is swung into a released position from the securing position. The surface forms a limit stop for the locking arm (6) which restricts the pivotal motion of the locking arm (6) in one direction of pivoting. The apparatus incorporates devices (7) for rearranging the locking arm in such a way that it is able to swing past the limit stop into a released position.

10 Claims, 4 Drawing Sheets

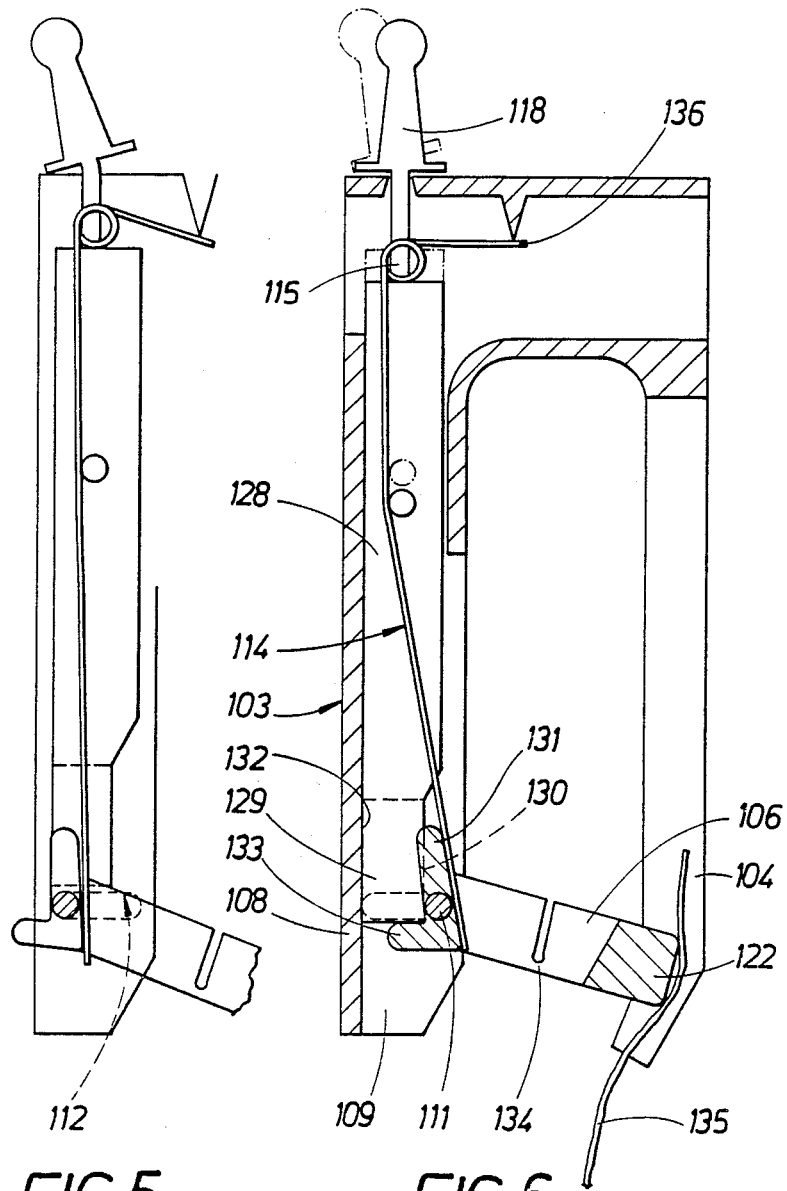

MEANS FOR SECURING OBJECTS

TECHNICAL FIELD

The present invention relates to a means for securing objects comprising a locking arm pivotally mounted in a frame which is so arranged, with the means in a securing position, as to be forced against a surface of the frame with the object lying in between and as to be swung from the securing position into a released position.

BACKGROUND

For the purpose of securing objects, for example pieces of material, in such a way that the object can be released easily, a number of different solutions is available depending on the desired function and the type of the object. Previously disclosed for the purpose of securing pieces of material, for example, is a means in the form of a spring-loaded arm which secures an object by friction against a holder positioned in front of it. By moving the arm out of the way in an upward sense the piece of material can be removed from its secured position. Having to swing the arm upwards constitutes a movement in an unfavourable sense, because it takes place in the opposite direction to the desired movement required to release the object, whereas to overcome the friction by pulling in a downward sense can cause damage to delicate pieces of material in certain circumstances.

TECHNICAL PROBLEM

The object of the present invention is to eliminate the aforementioned disadvantages by means of a securing means which operates in a highly favourable manner for the object.

THE SOLUTION

The aforementioned object is achieved by the means in accordance with the invention, which is characterized in that said surface forms a limit stop for the locking arm so arranged as to restrict the pivotal motion of the locking arm in one direction of pivoting, and in that the means incorporates devices for rearranging the locking arm in such a way that it is able to swing past the limit stop into a released position.

BRIEF DESCRIPTION OF DRAWINGS

The invention is described below in more detail in relation to a number of typical embodiments with reference to the accompanying drawings, of which:

FIG. 5 shows a longitudinal section through the means in a second embodiment in a first position, whilst FIG. 6 shows the means in a second position;

BEST MODE OF CARRYING OUT THE INVENTION

The means in accordance with the examples shown has been produced especially in order to permit the efficient handling of pieces of textile material in the clothing industry. The suspension means in the example shown is intended to constitute or form part of a transport unit in an overhead conveyor system for the transport of pieces of textile material between different work stations, in which case it is important to be able to release the pieces of cloth effectively from the suspension means without the risk of damage to the textile material.

Figure 1:
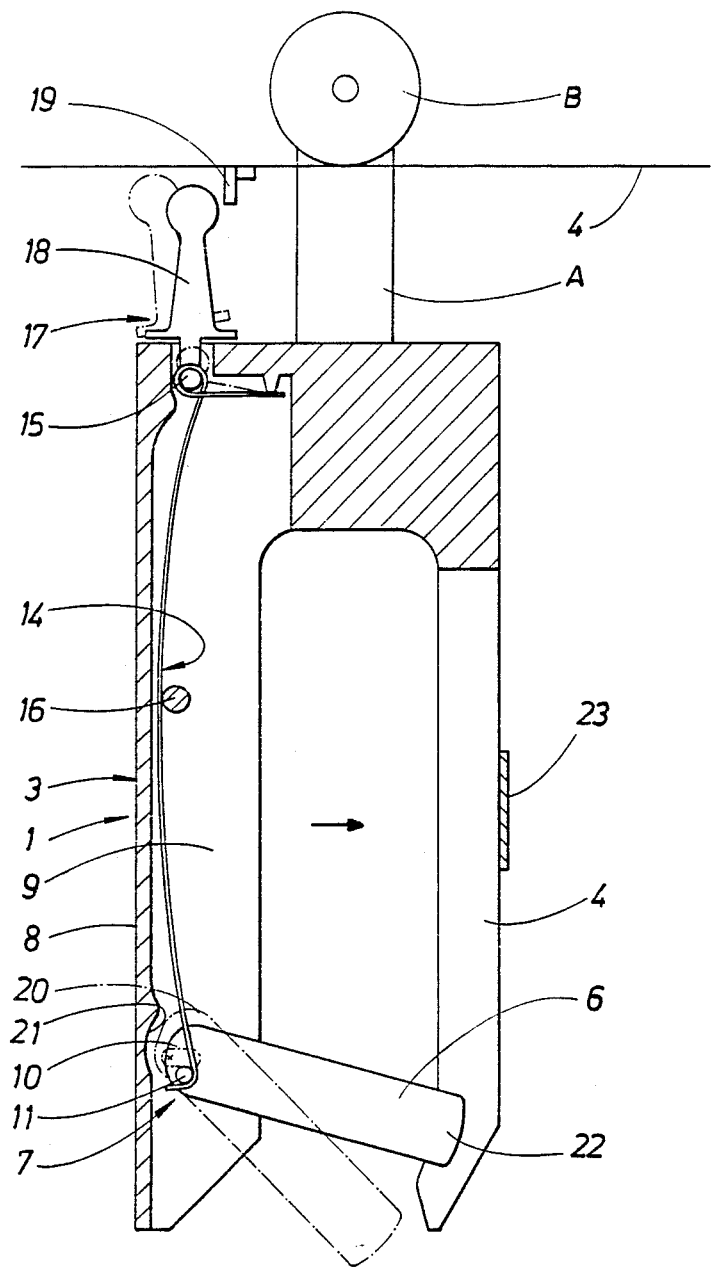
FIG. 1 shows a longitudinal section through the means in accordance with the invention in a first embodiment.
Figure 2:
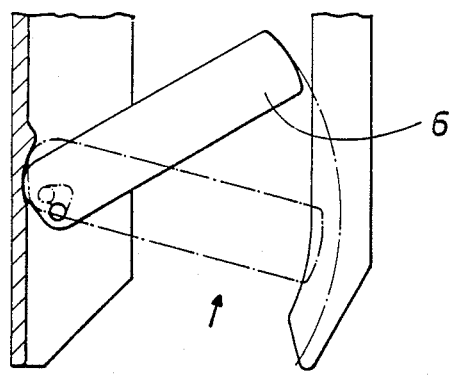
FIG. 2 shows part of the means in accordance with FIG. 1 in a different position.
Figure 3:
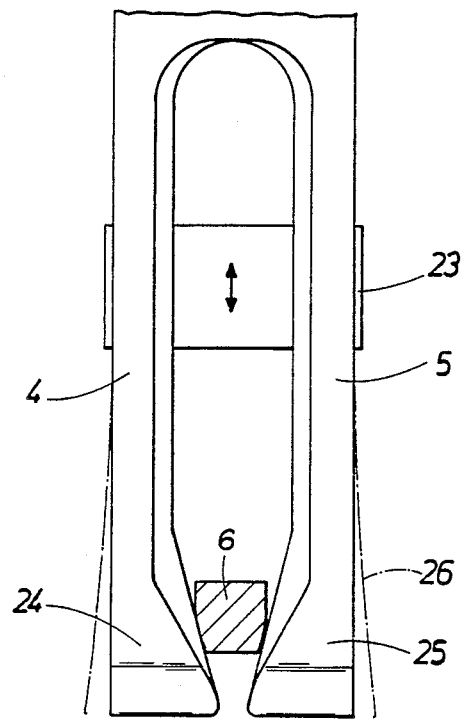
FIG. 3 shows a partly sectioned view from the front of the means in accordance with FIG. 1.
Figure 4:
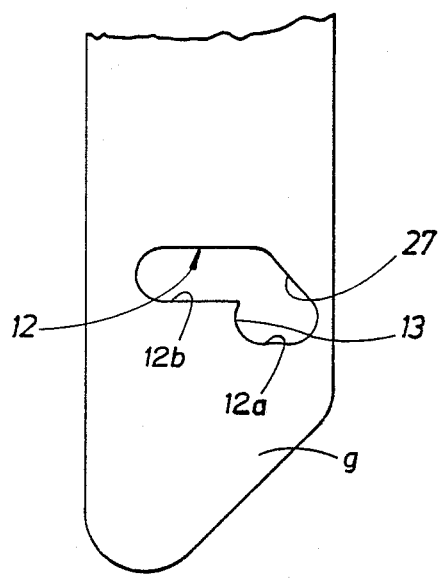
FIG. 4 shows on a larger scale a part of the means in accordance with the invention.

As may be seen from FIG. 1, a section is shown through a suspension means in accordance with the invention in the form of a first embodiment suspended by means of a bracket 4 from a conveyor roller 13, by means of which the suspension means moves along a conveyor 4 represented schematically. The movement may be achieved, for example, by giving the conveyor a certain inclination so that the suspension means will move of its own accord. The suspension means consists of a frame 2 with a rear frame leg 3 and two front frame legs 4,5, one of which is cut away in FIG. 1. The construction of the front two frame legs is apparent from FIG. 3, however. A central part of the suspension means is formed by a locking arm 6 which is pivotally mounted in a supporting means 7 in the rear frame leg 3, whilst the securing and locking of the object which is to be secured takes place against the front two frame legs 4, 5 which in this case form a holder against the locking arm. The rear frame leg in the example shown exhibits a U-shaped section with a back piece 8 and two side pieces 9, of which one is cut away in the Figures. Between the two side pieces 9 there is formed a space into which the locking arm extends by its rear end 10, in which case the arm exhibits a transverse shaft 11 or two side-facing pins which project into a slot 12 specially provided for that purpose in each of the side pieces 9. The shape of the slot is best appreciated from FIG. 4. The special shape of the slot provides two stable supporting or pivoting points for the locking arm 6, namely a front supporting or pivoting point 12a in which the arm is shown to be located in accordance with the solid line in FIGS. 1 and 2, and a rear supporting or pivoting point 12b in which the arm is shown to be located in accordance with the dot-and-dash line in FIGS. 1 and 2. The slot is shown to be of rather different shape in FIG. 2, although it provides the same function as the slot in accordance with FIGS. 1 and 4.

The means also exhibits in the typical embodiment shown a spring mechanism 14 in the form of a wire spring, which at the bottom is hooked around the shaft 11 and is held between an upper pin 15 and a fixed, interjacent pin 16 which projects from one of the side pieces 9, whereby the spring mechanism 14 endeavors to retain the locking arm 6 with the shaft 11 in position at both its pivoting or support points. The spring mechanism 14 also forms part of a release mechanism 17 which also incorporates a control lever 18, upon actuation of which the spring mechanism is caused to rise by the fact that the pin 15 is attached to the lower end of the lever 18. By moving the lever to the position indicated by a dot-and-dash line in FIG. 1, the mechanism is caused to rise with the result that the locking arm 6 with its shaft 11 is lifted from its front pivoting point 12a in an upward sense and is caused to move backwards to the rear pivoting point 12b under the effect of the rearward-acting spring bias from the spring mechanism. The control lever 18 can either be operated manually or automatically, for example by means of a downward-projecting and preferbly flexible activating element 19 situated at a work station, for example, with the result that the piece of material can be released automatically to fall at the desired point.

The locking arm 6 also exhibits at its rear end 10 a cam 20 so arranged as to interact with a control surface 21 on the back piece 8 causing the locking arm 6 to move forwards from the rear pivoting point 12b to the front pivoting point 12a when the locking arm 6 is moved in a direction from the bottom upwards with its front end 22, for instance between the positions illustrated in FIG. 1.

As will be appreciated from the Figures, the front end of the locking arm 6 projects for a certain distance between the front two frame legs 4, 5 which are made from an elastic material. The flexibility of the frame legs 4,5 can thus be regulated by means of a bridging element 23 which is capable of being displaced up or down the two frame legs. In its upper position the frame legs are permitted to flex to a great extent, enabling the front end of the locking arm to be pushed between the thickened free ends 24, 25 of the two frame legs and beyond them, this being represented schematically by means of dot-and-dash lines 26 in FIG. 3. In a lower position with the element 23 pushed down towards the free ends 24, 25 the two frame legs 4, 5 are rigid to all intents and purposes and are even capable of entirely blocking the passage of the locking arm 6 between the two legs. The length of the locking arm 6 is such, however, that said blocking will not occur with the locking arm in its rear position, that is to say with the shaft 11 positioned at the rear pivoting point 12b.

The use of the means in accordance with the invention in its first embodiment is explained with reference to FIGS. 1–4. It is assumed for this purpose that the movable element 23 adopts a position, for instance the position shown in FIGS. 1 and 3, which affords flexibility to the front legs 4,5. The initial position can be either with the locking arm 6 at its front pivoting point or with the locking arm at its rear pivoting point. We have assumed here that the locking arm is at its position indicated by dot-and-dash lines in accordance with FIG. 1, and with the shaft 11 at its rear pivoting point. The securing means is then in its released position. A piece of textile material is inserted by holding the piece of material by its upper edge with one hand and by moving the piece of material upwards in the gap between the rear and front frame legs 3, 4, 5, and then with the same hand moving the locking arm 6 upwards by causing it to pivot in an upward sense. The locking arm will then be in a rear position in which the locking arm is essentially free to move past the two front frame legs 4, 5 without being obstructed by them, in which case the piece of material will be situated between the free end 22 of the arm 6 and the legs 4,5. As the arm is swung upwards, the cam 20 on the arm will engage with the control surface 21, causing the shaft 11 to move forwards in the slot 12, and as a certain angle of pivoting is passed by the arm 6, for instance the angle shown in FIG. 2, the shaft 11 will be moved downwards and into its front supporting point resting against the supporting surface 13. Once the front supporting point has been adopted, the locking arm will have reached the pivoting position shown by solid lines in FIG. 2. If the locking arm 6 is now permitted to swing back into essentially the position indicated by solid lines in FIG. 1, the arm will be blocked against the front frame legs 4, 5 with the piece of material in between. The fact that the arm projects slightly between the frame legs will cause the piece of material to be folded slightly into the shape of a 'U', causing it to be held securely. The means in this case will be in the securing position, enabling the piece of material to be carried along the conveyor for the purpose of moving it to another work station. When it is wished to remove the piece of material, this can be done in two different ways. The simplest way of achieving this is to pull the piece of material in a downward sense, when the locking arm will be allowed to move past the two frame arms 4, 5 which will flex out of the way to a certain extent so that the locking arm can swing down into the position shown in FIG. 1 in dot-and-dash lines. The locking arm 6 is thus so arranged as to be released by being swung down at the same time as a force acting upon the arm is overcome, said force being considerably greater than the force required to swing the arm upwards. When a new piece of material is to be inserted, the locking arm can be returned by the application of light pressure to the outer end 22 of the locking arm, causing the locking arm to move to its rear position at the rear pivoting point. Alternatively, it is possible for the piece of material, as described above, to be released automatically or manually by activating the lever 18, causing the locking arm 6 to move to its rear pivoting point so that the piece of material is released.

Figure 7:
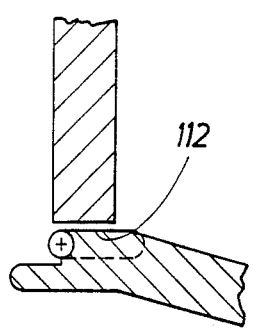
FIGS. 7, 8 and 9 show parts represented entirely schematically in three different positions.
Figure 8:
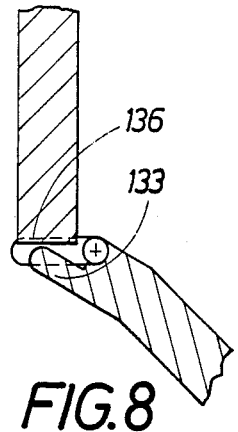
Figure 9:
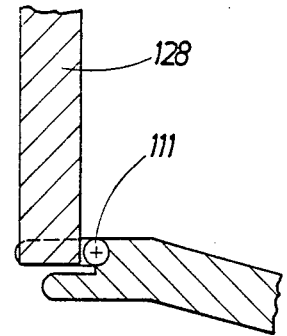

The embodiment in accordance with FIGS. 5 and 6 in principle exhibits the same function with regard to the action of the locking arm. In this second embodiment, the components which are the same as those in the first embodiment have been allocated corresponding reference designations, but with the addition of 100. In this case the mechanism for holding the locking arm 106 about its front pivoting point is executed differently. In this embodiment the slot 112 is executed as a straight slot, to which has been added a long activating rod 128 which extends into the rear frame leg between the upper attachment 115 of the spring mechanism 114 and the rear end of the locking arm 106. The activating rod 128 is capable of being moved between an upper position as shown in FIG. 5 and a lower position as shown in FIG. 6 in a fashion described in greater detail below. The prepared section shown in FIGS. 5 and 6 is considered to extend centrally, from which it will be apparent that the activating rod 128 is divided at the bottom into two shanks 129 extending along the inside of the two side pieces 109, said shanks being intended to interact with the pins 111 of the locking arm 106 in such a way that, with the activating rod 128 in its lower position in accordance with FIG. 6, the locking arm 106 is held in its front pivoting position by interaction between the front edges 130 and said shanks and the pins. The locking arm 106 is also executed at its rear end with a normal upward-facing finger 131 which can be introduced into the space between the two shanks 129, in this way not interfering with them and yet assuring the position of the locking arm for the purpose of its movement from its rear pivoting point to its front pivoting point through interaction with the wall 132 of the back piece 108 as it is swung from the downward, released position and in an upward sense. A normal, backward-facing finger 133 serves the function of moving the activating rod 128 from its lower position to its upper position whilst the locking arm 106 is being swung downwards. This may be appreciated from the schematic views in FIGS. 7, 8 and 9, which show a section made alongside the central section shown in FIGS. 5 and 6, and more precisely through one of the shanks 129, in connection with which the upward-facing finger 131 does not lie in the section and is not illustrated in the interests of clarity.

With further reference to FIGS. 5 and 6 it is evident that the locking arm 106 is also in two parts and is articulated at an articulation point 134, whereby in certain circumstances it is possible for the arm to be swung upwards without being moved from the front pivoting point to the rear pivoting point. In this case the locking arm 106 is best made from a high-grade elastic material such that the inherent elasticity of the material can be utilized to provide said articulated function.

The use of the means in accordance with the second embodiment is explained with reference to FIGS. 5–9. The initial position is such that a piece of material 135, shown in section in FIG. 6, is held securely between the free outer end 122 of the locking arm 106 and the two front legs 104.

The activating rod is thus in its lower position, when its shanks 129 prevent the pins 111 from being displaced from their front pivoting point under the effect of the spring mechanism 114, thereby causing the piece of material to be held securely in the manner described above. The interaction between the activating rod 128 and the pins 111 may also be appreciated from FIG. 9. By pulling the piece of material 135 in a downward sense, the locking arm 126 will be caused to accompany it because of the friction between the free end 122 of the locking arm and the piece of material, in which case the backward-facing finger 133 will be caused by being forced against the underside 136 of the activating rod 128 to lift the latter in such a way that the lower edges of the shanks adopt a position above the pins 111, in which case the locking arm will be caused to move under the effect of the spring mechanism 114 to its rear pivoting position in accordance with FIGS. 5 and 7 by the movement of the pins 111 along the straight slot 112.

When another piece of material is to be inserted, the locking arm is moved in an upward sense with the result that, as shown by FIG. 5, the upward-facing finger 131 will, through its cotact with the wall 132, cause the pins of the locking arm to move forwards until the activating rod 128 drops down through the effect of the spring mechanism 114, which is pre-tensioned against a support point 136 in such a way that a downward-acting force is applied to the activating rod.

By analogy with the alternative possibility in the first embodiment, manual or automatic release can be provided by means of the control lever 118, the actuation of which will cause the activating rod 128 to be raised and the corresponding events to occur, as described above.

Figure 10:
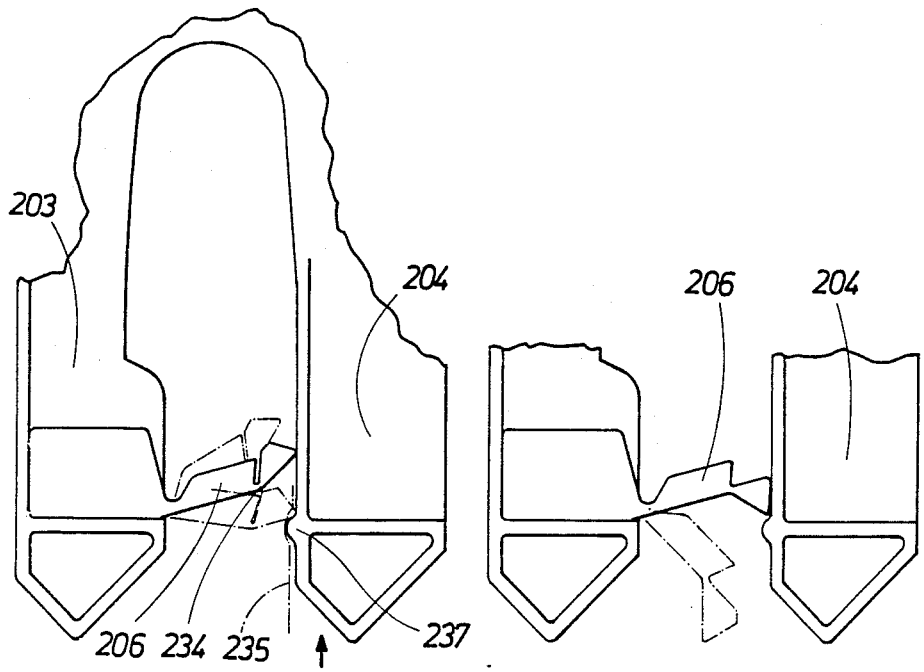
FIGS. 10, 11 and 12 show the means in a third embodiment.
Figure 11:
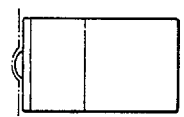
Figure 12:
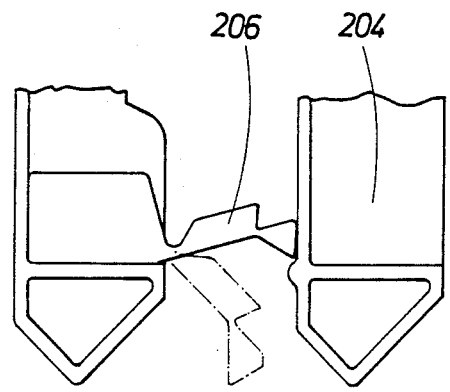

In FIGS. 10, 11 and 12 there is shown a third embodiment which differs in certain respects from the preceding embodiment. The corresponding parts have been allocated the same reference designations, but with the addition of 200. In accordance with this example, too, the central part of the securing means consists of a locking arm 206 which bridges a gap between a rear frame leg 203 and, in this case, only a single front frame leg 204. The locking arm 206 in this case is best made from an elastic material and is divided into two parts which are articulated relative to one another about an articulation point 234. In place of two frame legs which are sprung relative to one another, the front frame leg 204 in this case exhibits a stop 237 which normally forms a limit stop against which the piece of material 235 is held. The articulation of the locking arm 206 is such that articulation is provided until a certain angle is reached between the two articulated parts without great resistance, although further articulation can only occur if an increased force effect is overcome.

The piece of material 235 is thus held under the effect of friction between the locking arm and the piece of material, in which case it is possible to release the piece of material by pulling the piece of material in a downward sense, causing the locking arm to be allowed to pass the limit stop 237 because of elastic deformation, in conjunction with which the bridged gap will open, when the position indicated in FIG. 12 by dot-and-dash lines will be adopted. Alternatively, the release may be facilitated by manually pressing against the articulation point 234 from below, when the locking arm 206 will adopt the position indicated in FIG. 12 by a solid line.

The return of the locking arm 206 to a position above the limit stop 237 takes place with minimal resistance due to the fact that the locking arm, as it makes contact with the limit stop, is able very easily to bend around the articulation point 234 so that the locking arm will move past the limit stop without problem, when a piece of material can be inserted and held between the locking arm and the frame leg 204.

The invention is not restricted to the typical embodiments described above and illustrated in the drawings, but may be modified within the scope of the following patent claim. For example, the means in accordance with FIGS. 5 and 6 need not be provided with the articulated function which divides the locking arm into two parts articulated relative to each other. Furthermore, neither the first nor the second embodiment need necessarily exhibit the separate release mechanism with the lever 18. Nor need the stop be in the form of two frame legs, as in the first and second embodiments, but may consist of a ridge as shown in the third embodiment, which can thus also be combined with the return movement of the locking arm by the adoption of two different pivoting points.

I claim:

1. A device for securing an object, comprising: a frame having a surface; a locking arm having an end and also having pivot shaft means; and slot means in said frame for supporting said pivot shaft means in predetermined first and second positions, in said first position said end of said locking arm clamping said object against said surface, said surface forming a limit stop restricting pivotal motion of said locking arm in one direction; in said second position the distance of said pivot shaft means from said limit stop being larger than in said first position, whereby said end of said locking arm is movable in said one direction beyond said limit stop to thereby release said object.

2. A device according to claim 1, wherein said frame has resilient leg means, said limit stop being provided on said leg means, and means displaceable along said leg means for adjusting resiliency of said leg means.

3. A device according to claim 2, wherein said locking arm is forceably movable from said first postion to said second position on account of the resiliency of said leg means.

4. A device according to claim 1, comprising a release mechanism for moving said pivot shaft means from said first position to said second position.

5. A device according to claim 4, in combination with a conveyor for transporting an object secured to said device between predetermined stations, and activating means at at least one of said stations for activating said release mechanism to thereby move said locking arm from said first to said second position.

6. A device according to claim 1, wherein said locking arm is movable to a bottom released position when said pivot shaft means is supported in said slot means in said predetermined second position.

7. A device according to claim 6, wherein said pivot shaft means is movable in said slot means between a forward pivot point and a rearward pivot point comprising said predetermined first and second positions hereof, respectively.

8. A device according to claim 7, comprising a release mechanism for actively adjusting said pivot shaft means to its rearward pivot point so that said locking arm is able to freely swing past the limit stop.

9. A device according to claim 8, in combination with a hanging conveyor for transporting an object secured to said device between predetermined stations, and an activating element positioned at at least one of said stations for activating said release mechanism upon passage of the device thereby for moving said locking arm to its rearward pivot point.

10. A device according to claim 2, wherein said leg means comprise two legs and said means displaceable along sid legs comprise a connecting element connecting said legs.

* * * * *